United States Patent [19]

Wiesner et al.

[11] 4,241,227
[45] Dec. 23, 1980

[54] PROCESS FOR REDUCING BIOLOGICAL OXYGEN DEMAND OF GAS CONDENSATE

[75] Inventors: Paul Wiesner, Oberursel; Fritz Wöhler, Frankfurt am Main; Hans-Martin Stönner, Schwalbach, all of Fed. Rep. of Germany

[73] Assignee: Metallgesellschaft Aktiengesellschaft, Frankfurt am Main, Fed. Rep. of Germany

[21] Appl. No.: 705,111

[22] Filed: Jul. 14, 1976

[30] Foreign Application Priority Data

May 5, 1976 [DE] Fed. Rep. of Germany ....... 2619805

[51] Int. Cl.³ .............................................. C07C 37/70
[52] U.S. Cl. .................................................. 568/761
[58] Field of Search ........... 260/627 R, 627 H, 621 R, 260/621 A, 627; 568/761

[56] References Cited

U.S. PATENT DOCUMENTS

| | | | |
|---|---|---|---|
| 2,595,516 | 5/1952 | Doughty et al. | 260/627 R |
| 2,675,412 | 4/1954 | Herbert et al. | 260/627 R |
| 2,807,654 | 9/1957 | Grimmett et al. | 260/627 R |
| 3,203,874 | 4/1965 | Somerville | 260/627 R |
| 3,277,185 | 10/1966 | Eisenlohr et al. | 260/627 R |

Primary Examiner—Werren B. Lone
Attorney, Agent, or Firm—Karl F. Ross

[57] ABSTRACT

Gas condensates formed from the gases obtained from coal gasification, cokefication, or carbonization are extracted with an acid- and alkali-resistant solvent, e.g. organic esters or ethers, and phenols are thereby removed. The extract is separated into solvent and phenolic phases and the solvent is recycled to the extraction process. The same solvent is used in a greater quantity for a second stage treatment of the gas condensate to preferentially remove tar bases and again the solvent and tar base phases are separated with recycling of the solvent. Residual solvent, acid gases and other volatile components are removed from the gas condensate by distillation and/or stripping with the ammonia and acid gases being separately recovered. The gas condensate is thereafter subjected to biological cleaning, e.g. by a biological oxidation.

8 Claims, 1 Drawing Figure

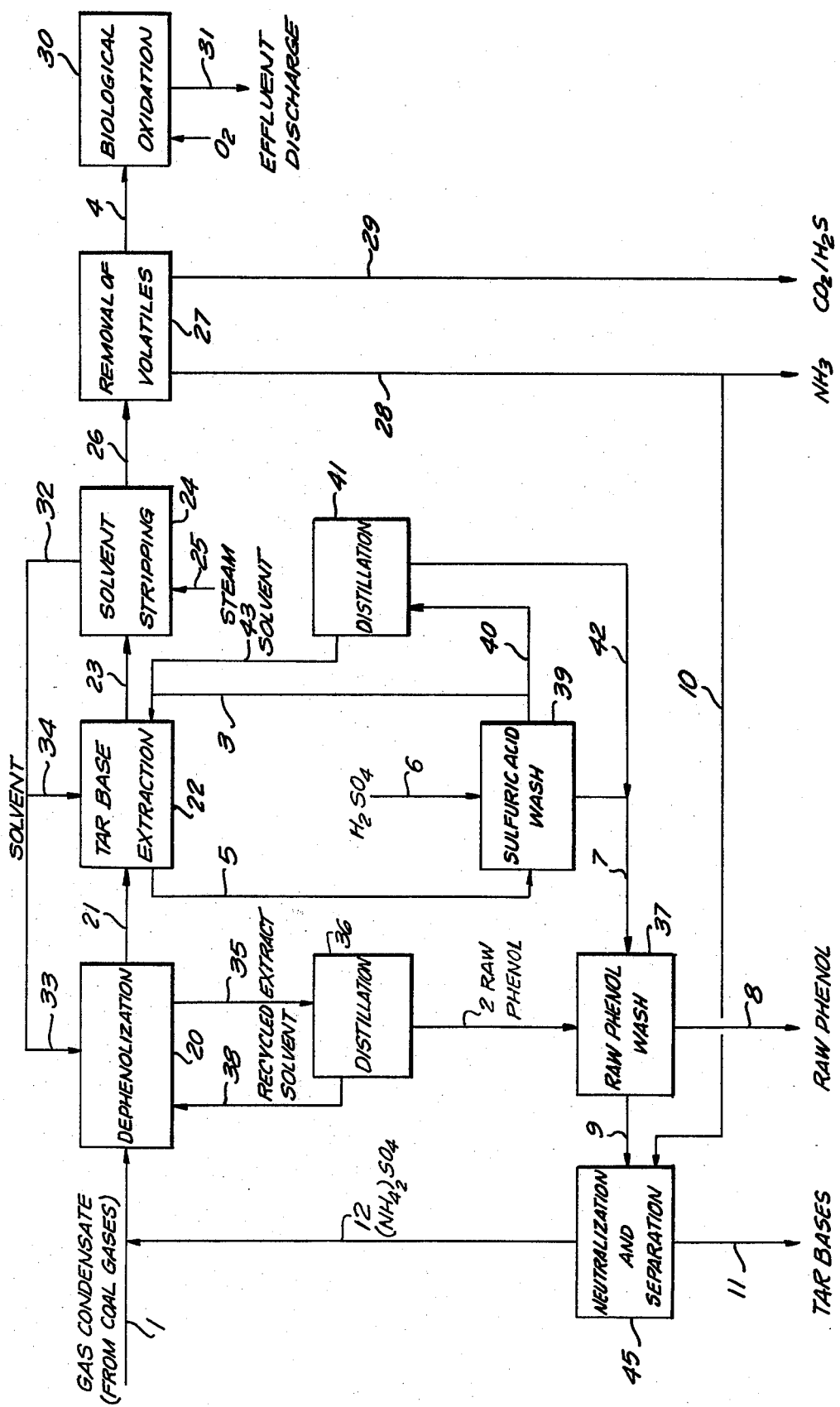

PROCESS FOR REDUCING BIOLOGICAL OXYGEN DEMAND OF GAS CONDENSATE

FIELD OF THE INVENTION

The present invention relates to a method of treating gas condensates obtained from gas-forming processes from organic material and, more particularly, to improvements in the treatment of gas condensates obtained from the gasification of coal, from coking processes or from a carbonization operation. Specifically the invention deals with reducing the biological oxygen demand (BOD) of gas condensates to be subjected to biological cleaning before discharge.

BACKGROUND OF THE INVENTION

Gas condensates arise from the destructive distillation of organic material such as coal, e.g. in coal gasification plants, in coke furnaces and others and in carbonization processes, these condensates containing various impurities which are detrimental to the environment and require removal. After removal of the noxious or toxic impurities, at least some of which are recoverable for economical use, the balance of the condensate may be discharged into an effluent stream from the plant. Stringent environmental protection requirements in recent years have made it necessary to subject the condensate before discharge as the effluent to biological cleaning, e.g. an activated sludge process whereby microorganisms and oxygen cause decomposition of residual organic compounds to produce a decantate which is practically clean and can be discharged into streams or the like without the danger of contaminating them.

Biological purification may take place in activated sludge tanks, sedimenting and settling tanks with or without aid of flocculants and with or without injection of oxygen to promote decomposition.

In general the degree of contamination of the condensate to be subjected to biological cleaning can be measured by its biological oxygen demand (BOD). It is desirable to subject to purification a gas condensate having as low a biological oxygen demand as possible so that the residence time required for biological cleaning is minimized and the product of the biological cleaning is as pure and free from contaminants as possible.

The gas/water-vapor mixture derived from a carbonization or coking process can be cooled to form the gas condensate which contains ammonia, acid gases such as sulfur dioxide ($SO_2$), carbon dioxide ($CO_2$) and hydrogen sulfide ($H_2S$), tars, neutral oils, phenols and tar bases. Tar bases are tarry substances or substances trapped in or entrained by the tars which have a basic character and include pyridine-containing tars. The term "acid gases" is used to describe gases with an acidic character such as the aforementioned $SO_2$, $CO_2$ and $H_2S$. The bases contained in the condensate include ammonia ($NH_3$) and the aforementioned tar bases.

In practice it is found that the phenol and tar bases content is dependent on the process temperatures, at 600° C., 20 to 30 grams per liter of phenols and about 5 grams per liter of tar bases are present in the condensate.

It has been proposed heretofore to treat such gas condensates by an initial mechanical clarification resulting in the separation of tars and its filtration from the liquid phase, to treat the liquid phase with a solvent for the phenols (extractive dephenolization), to steam distill off components susceptible to steam distillation such as ammonia, hydrogen sulfide, carbon dioxide and HCN, and thereafter to subject the liquid phase to biological purification.

The effluent from the final step in the process can generally be discharged into the environment with no detrimental effect and usually meets the stringent requirements for discharge effluents and waste water regulations.

It has already been found that extractive dephenolization considerably reduces the biological oxygen demand of the water (see H. J. WURM, "Untersuchungen über die Wirtschaftlichkeit der wichtigsten physikalisch-chemischen Verfahren zur Entphenolung von Kokereiabwässern", Dissertation, Technische Hochschule Aachen, Germany (1973)—("Investigations into the economies of the significant physical-chemical process in the dephenolization of coking waste water"). In this operation, the removal of steam distillable phenols is up to 99.9% while other phenols and tar bases are removed only in minor proportion. The remaining tar bases, phenolic matter and other substances which cannot be removed by the prior art processes appear to contribute substantially to the biological oxygen demand of the condensate after the process steps which prepare the condensate for biological decontamination.

OBJECTS OF THE INVENTION

It is the principal object of the present invention to provide a method of reducing the biological oxygen demand of a gas condensate of the character described prior to the biological decontamination thereof.

It is another object of the invention to provide an improved method of treating gas condensate obtained from the destructive distillation of coal whereby the resulting effluent can be relatively pure and which can be carried out at low cost.

Another object of the invention, in the treatment of gas condensates of the type described, is to reduce the loading on the biological treatment units as much as possible.

SUMMARY OF THE INVENTION

These objects and others which will become apparent hereinafter are attained, in accordance with the invention, in a method of or a process for the treatment of a gas condensate from the destructive distillation of coal wherein an acid and alkaline resistant solvent is first used to extract the condensate to remove phenols preferentially; a large quantity of the same solvent is then used to extract the dephenolated condensate so as to remove preferentially the tar bases, the doubly extracted gas condensate is stripped of $NH_3$ and acid gases and the stripped gas condensate is subjected to biological cleaning.

It is indeed surprising that with this sequence of steps and the twofold extraction process, using a large quantity of the same solvent for the second extraction step, the biologically oxygen demand can be markedly reduced in the condensate subjected to biological cleaning. The size of the biological cleaning plant, which may be an activated sludge tank, sedimentation or settling tank, oxygen-injection water treatment tank or the like, can be reduced by comparison to earlier gas-condensate-treatment system, the residence time of the gas condensate in the biological decontamination tank can be reduced, and the overall process is highly economical.

According to a feature of the invention, after each extraction stage, the extract is recovered from the solvent phase which is recycled to either or both of the extraction steps. The $NH_3$ and acid gases can be distilled off and/or stripped with, for example, steam so that ammonia and the acid gases can be recovered separately.

According to a preferred feature of the invention, therefore, the method comprises the steps of:
(a) extracting a gas condensate obtained from the destructive distillation of coal (coal carbonization or cokefication) with an acid- and alkaline-resistant solvent to extract phenol from the gas condensate;
(b) separating the solvent from the extract and recycling the solvent to step (a), this solvent being used in a relatively small volume rate of flow;
(c) extracting the initially extracted gas condensate with a larger quantity of the same solvent to preferentially remove tar bases therefrom;
(d) separating the tar bases from the latter solvent in recycling it to step (c);
(e) distilling or stripping off residual solvent, $NH_3$ and acid gases from the gas condensate after the second extraction step and separately recovering the ammonia and acid gases; and
(f) subjecting the condensate after step (e) to biological cleaning.

The preferred solvent is an organic ether or a ketone or a mixture thereof with best results being obtained with di-isopropyl ether and methylisobutyl ketone.

According to a feature of the invention, the ratio of the solvent to the gas condensate is 1:10 (by volume) in step (a) while the ratio of solvent to gas condensate is at least 1:1 and preferably at least 2:1 in step (c).

According to a feature of the invention, a chemical treatment is also used to neutralize acids or bases preferably while they are entrained in the solvent. This chemical treatment can be an acid wash, preferably the sulfuric acid, although both an alkaline and an acid wash can be used. The acidic tar bases can be neutralized with $NH_3$ produced during the treatment process and gravity separation can be used to recover the neutralized tar bases as a separate phase from the aqueous phase which can be returned to the gas condensate.

We have found it to be highly advantageous to use the separated tar base acids resulting from an acid wash of the tar base extract to scrub the raw phenols and thereby remove the tar base contained in this compound. The resulting tar base acids, after neutralization with ammonia, separate as the lighter phase and can be drawn off.

BRIEF DESCRIPTION OF THE DRAWING

The above and other objects, features and advantages of the present invention will become more readily apparent from the following description, reference being made to the accompanying drawing in which the sole FIGURE is a flow diagram illustrative of the process of the present invention.

SPECIFIC DESCRIPTION AND EXAMPLE

The flow diagram of the drawing shows an input 1 for the gas condensate from the destructive distillation of coal to a multistage counterflow extractor 20 in which dephenolization is carried out, the extracted condensate being fed at 21 to another multistage counterflow extractor 22 for tar base extraction. The double extracted condensate is then fed at 23 to a solvent-stripping stage 24 to which steam can be admitted at 25 and which can be a conventional solvent stripping column. The condensate from which the solvent has been stripped is led at 26 to a volatile-removal stage 27 at which ammonia is recovered at 28 and the acid gases, e.g. $CO_2$ and $SO_2$ are recovered at 29. The gas condensate is then fed at 4 to a biological observation stage 3 from which the effluent 31 can be discharged safely into a stream.

Line 32 represents the solvent-recycling path from the stripping stage 24 whereby the solvent can be returned at 33 to the dephenolization stage or at 34 to the tar-base extraction stage.

The extract from the dephenolization stage 20 is led at 35 therefrom and subjected to distillation in a conventional column 36 from which the raw phenols are led at 2 to a raw-phenol washing stage 37. Recycled solvent from the distillation stage is fed at 38 back to the dephenolization stage.

While most of the solvent for the tar base extraction stage is subjected to an acid wash at 39 and recycled to the tar base extraction stage 22, a portion may be led off at 40 to a distillation stage 41 from which the tar acids are carried at 42 to the raw-phenol washing stage 37 while the solvent is fed at 43 to the tar base extraction stage 22. The distillations 36 and 41 may be combined in a single stage.

EXAMPLE

The present example is given in terms of units of quantity for convenience and, since the process is continuous, these units of quantity may be treated as time rates, e.g. units of quantity per hours.

A 100 $m^3$ of a gas condensate containing about 10 grams per liter of extractable phenols and 4.1 grams per liter of tar bases, together with ammonia, carbon dioxide and hydrogen sulfide, is fed into the system at 1 and is extracted with 10 volume % di-isopropyl ether in the counterflow extractor 20. The raw phenol is recovered at 2 by distillation of the extract at 36 (1.04 t). The raw phenol contains about 30 kg of pyridine base.

The dephenolized gas condensate at 21 is treated at 22 with 120 volume % of di-isopropyl ether supplied by stream 3, line 43 and line 34, whereby 360 kg of tar bases are extracted. The extract at line 5 is subjected to sulfuric acid washing at 39, the acid being supplied at 6.

The doubly extracted gas condensate is delivered at 26 to a stripping stage 27 in which the volatile components $NH_3$ and $CO_2$ and $H_2S$ are recovered from the vapors individually and substantially in a chemically pure state. The cleaned gas condensate with extremely low biological oxygen demand flows at 4 to the biological oxidation state at 30 and the effluent is discharged at 31.

In stage 39, the di-isopropyl ether loaded with the tar bases from line 5 is washed with 0.7 $m^3$ of 30% $H_2SO_4$ delivered by line 6 and is again used for tar base extraction.

The acid phase, loaded with tar bases (approximately 1.0 $m^3$) is delivered at 7 to the raw phenol wash stage 37 where it is contacted with raw phenol in order to remove the 40 kg of pyridine base contained therein. The raw phenol, now free from bases, is discharged at 8 from the plate while the pyridine base (tar acid product) is delivered to the neutralization stage 45 in which it is treated with ammonia from line 10 (86 kg). 400 kg of tar bases separate out and are recovered a 11. The ammonium sulfate solution is fed to the gas condensate at line 1 via the line 12.

We claim:

1. A process for treating a gas condensate from the destructive distillation of coal containing tar bases, extractable phenol and volatile compounds including ammonia and acid gases selected from the group which consists of $CO_2$, $H_2S$ and HCN, which comprises the steps of
   (a) extracting said gas condensate with an organic solvent selected from the group of diisopropyl ether and methylisobutylketone to form a phenol-containing extract and a dephenolated gas condensate;
   (b) separating the phenol-containing extract from step (a) into a solvent phase and a phenol phase by distillation and the solvent phase is recycled to step (a);
   (c) extracting the dephenolated condensate of step (a) with the same solvent used in step (a) but in a greater quantity to remove tar bases from the dephenolated gas condensate and form a tar base extract and a gas condensate free from tar base;
   (d) chemically treating the tar base extract from step (c) and separating it into another solvent phase and a tar phase by contacting the tar base extract with sodium hydroxide and/or sulfuric acid, said other solvent phase being recycled to step (c); and
   (e) driving off by distillation said volatile compounds including traces of organic solvent, ammonia and acid gases of the group of $CO_2$, $H_2S$, HCN, whereby said organic solvent, ammonia and said acid gases are recovered separately from said gas condensate free from tar base from step (c) to produce a decontaminated gas condensate of low biological oxygen demand suitable for biological oxidation treatment.

2. The process defined in claim 1 wherein the solvent in step (a) is used in a ratio to the gas condensate by volume of 1:10.

3. The process defined in claim 1 wherein said ratio is at least 2:1.

4. The process defined in claim 1 wherein said chemical treatment in step (d) is an sulfuric acid wash performed at ambient temperature.

5. The process defined in claim 4 wherein the tar base containing phase recovered by said acid wash is neutralized with said ammonia, thereby producing two phases which are separated by settling.

6. The process defined in claim 4 wherein the tar base containing phase recovered by said acid wash is used to treat the phenol recovered by distillation of the extract in step (b) to remove pyridine bases therefrom.

7. The process defined in claim 5 wherein one of the said two phases is an ammonium sulfate solution, said process further comprising the step of feeding said ammonium sulfate solution to the gas condensate introduced in step (a).

8. The process defined in claim 1 wherein said chemical treatment is a sodium hydroxide and a sulfuric acid wash.

* * * * *